United States Patent
Waring et al.

(10) Patent No.: US 8,073,870 B2
(45) Date of Patent: Dec. 6, 2011

(54) METHODS FOR STORING DATA

(75) Inventors: Malcolm Merritt Waring, Shawnee on Delaware, PA (US); Rishikant K. Chaturvedi, Hatfield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 550 days.

(21) Appl. No.: 12/284,944

(22) Filed: Sep. 25, 2008

(65) Prior Publication Data
US 2010/0082686 A1  Apr. 1, 2010

(51) Int. Cl.
G06F 12/00 (2006.01)
G06F 17/30 (2006.01)

(52) U.S. Cl. .................. 707/785; 707/793; 707/805
(58) Field of Classification Search .............. 707/785
See application file for complete search history.

(56) References Cited

U.S. PATENT DOCUMENTS

| | | | |
|---|---|---|---|
| 6,058,391 A * | 5/2000 | Gardner | 1/1 |
| 6,470,320 B1 | 10/2002 | Hildebrand et al. | |
| 7,428,410 B2 * | 9/2008 | Petry et al. | 455/412.1 |
| 2002/0099686 A1 | 7/2002 | Schwartz et al. | |
| 2002/0152200 A1 * | 10/2002 | Krichilsky et al. | 707/3 |
| 2003/0101076 A1 | 5/2003 | Zaleski | |
| 2003/0191768 A1 * | 10/2003 | Choy | 707/100 |
| 2005/0187937 A1 * | 8/2005 | Kawabe et al. | 707/9 |
| 2005/0203819 A1 * | 9/2005 | Rogers et al. | 705/35 |
| 2006/0064645 A1 * | 3/2006 | Neven et al. | 715/753 |
| 2006/0167850 A1 * | 7/2006 | Fish et al. | 707/3 |
| 2007/0198601 A1 * | 8/2007 | Prahlad et al. | 707/201 |
| 2007/0299823 A1 * | 12/2007 | Getsch et al. | 707/3 |
| 2009/0177685 A1 * | 7/2009 | Ellis et al. | 707/103 R |
| 2009/0204635 A1 * | 8/2009 | McCormack et al. | 707/103 R |
| 2010/0036750 A1 * | 2/2010 | Whelan | 705/27 |

* cited by examiner

Primary Examiner — Don Wong
Assistant Examiner — Binh V Ho
(74) Attorney, Agent, or Firm — Willard Jones, II

(57) ABSTRACT

A method for storing data includes the steps of receiving a metadata parameter from a first user, the parameter being associated with a property in a database containing a plurality of data records, and storing the parameter. The method also includes the step of providing a second user with access to the stored parameter, the second user having an access level to the database which is different from that of the first user.

21 Claims, 15 Drawing Sheets

```
Select
      [name] AS DatabaseName
FROM sys.databases
```

Fig. 4

```
Select
      [name] AS DatabaseName,
      convert(varchar(50), [create_date], 1) AS Created
FROM sys.databases
WHERE [name] NOT IN
(
      'master',
      'tempdb',
      'model',
      'msdb',
      'ReportServer',
      'ReportServerTempDB',
      'AdventureWorks',
      'AdventureWorksDW', )
ORDER BY
      DatabaseName
```

Fig. 5

| ApmReference ▶ | | | | | Records in Dataset 1000 ▶ | ☐ Leave Tables Open | Close All |
|---|---|---|---|---|---|---|---|
| Meta | | | | | | | |
| Schema | Table | Column | Type | Keys | Friendly Name | Source Desc | Description |
| Classification | Tablename A | | | | | | |
| Classification | Tablename B | | | | | | |
| Classification | Tablename C | | | | | | |
| Classification | Tablename D | | | | | | |
| Classification | Tablename E | | | | | | |
| Classification | Tablename F | | | | | | |
| Classification | Tablename G | | | | | | |
| Classification | Tablename H | | | | | | |
| Classification | Tablename I | | | | | | |
| Classification | Tablename J | | | | | | |
| Classification | Tablename K | | | | | | |
| Classification | Tablename L | | | | | | |
| CPT | Tablename M | | | | | | |
| CPT | Tablename N | | | | | | |
| CPT | Tablename O | | | | | | |
| Drug | Tablename P | | | | | | |
| Drug | Tablename Q | | | | | | |
| Drug | Tablename R | | | | | | |
| Drug | Tablename S | | | | | | |
| Drug | Tablename T | | | | | | |
| Drug | Tablename U | | | | | | |
| Drug | Tablename V | | | | | | |

Fig. 12

| ApmReference ▶ | | | | | | | Records in Dataset | 1000 ▶ | ☐ Leave Tables Open | Close All |
| Meta | Tablename C | | | | | | | | | |
| Schema | Table | Column | Type | Keys | Friendly Name | Source Desc | Description | | | |
| Classification | Tablename A | | | | | | | | | |
| Classification | Tablename B | | | | | | | | | |
| Classification | Tablename C | | | | | | | | | |
| | | Colname A | int | PK | | | | | | |
| | | Colname B | nvarchar[100] | | | | Description A | | | |
| | | Colname C | nvarchar[400] | | | | Description B | | | |
| | | Colname D | int | | | | | | | |
| Classification | Tablename D | | | | | | | | | |
| Classification | Tablename E | | | | | | | | | |
| Classification | Tablename F | | | | | | | | | |
| Classification | Tablename G | | | | | | | | | |
| Classification | Tablename H | | | | | | | | | |
| Classification | Tablename I | | | | | | | | | |
| Classification | Tablename J | | | | | | | | | |
| Classification | Tablename K | | | | | | | | | |
| Classification | Tablename L | | | | | | | | | |
| CPT | Tablename M | | | | | | | | | |
| CPT | Tablename N | | | | | | | | | |
| CPT | Tablename O | | | | | | | | | |
| Drug | Tablename P | | | | | | | | | |
| Drug | Tablename Q | | | | | | | | | |
| Drug | Tablename R | | | | | | | | | |

Records in Dataset [1000] ▶ ☐ Leave Tables Open [Close All] — 636

| Meta | Tablename C | Tablename H | Tablename K | | | | |
|------|-------------|-------------|-------------|---|---|---|---|
| Schema | Table | Column | Type | Keys | Friendly Name | Source Desc | Description |
| Classification | Tablename A | | | | | | |
| Classification | Tablename B ~615 | | | | | | |
| Classification | Tablename C | | | | | | |
| | | Colname A | int | PK | | | |
| | | Colname B | nvarchar[100] | | | | Description A |
| | | Colname C | nvarchar[400] | | | | |
| | | Colname D | int | | | | Description B |
| Classification | Tablename D | | | | | | |
| Classification | Tablename E | | | | | | |
| Classification | Tablename F | | | | | | |
| Classification | Tablename G ~617 | | | | | | |
| Classification | Tablename H | | | | | | |
| | | Colname E | nvarchar[100] | | | | |
| | | Colname F | nvarchar[530] | | | | |
| | | Colname G | int | | | | |
| Classification | Tablename I | | | | | | |
| Classification | Tablename J ~619 | | | | | | |
| Classification | Tablename K | | | | | | |
| | | Colname H | int | | | | |
| | | Colname I | nvarchar[510] | | | | |
| | | Colname J | nvarchar[510] | | | | |
| Classification | Tablename L | | | | | | |
| CPT | Tablename M | | | | | | |

616  620

| Meta | Tablename H | | | | | | |
|------|------|------|------|------|------|------|------|
| Schema | Table | Column | Type | Keys | Friendly Name | Source Desc | Description |
| Classification | Tablename A | | | | | | |
| Classification | Tablename B | | | | | | |
| Classification | Tablename C | | | | | | |
| Classification | Tablename D | | | | | | |
| Classification | Tablename E | | | | | | |
| Classification | Tablename F | | | | | | |
| Classification | Tablename G | | | | | | |
| Classification | Tablename H | | | | | | |
| | | Colname E | nvarchar[100] | | | | |
| | | Colname F | nvarchar[530] | | | | |
| | | Colname G | int | | | | |
| Classification | Tablename I | | | | | | |
| Classification | Tablename J | | | | | | |
| Classification | Tablename K | | | | | | |
| Classification | Tablename L | | | | | | |
| CPT | Tablename M | | | | | | |
| CPT | Tablename N | | | | | | |
| CPT | Tablename O | | | | | | |
| Drug | Tablename P | | | | | | |
| Drug | Tablename Q | | | | | | |
| Drug | Tablename R | | | | | | |
| Drug | Tablename S | | | | | | |
| Drug | Tablename T | | | | | | |

Records in Dataset 1000    ☐ Leave Tables Open    [Close All]

Fig. 16

METHODS FOR STORING DATA

BACKGROUND OF THE INVENTION

This invention relates to methods for storing data.

When working with databases, users often need to make notations on the database. Such notations are known as metadata, or data describing other data. As an illustrative example, one may wish to note the origin of a value, caveats associated with certain columns, mark a column for deletion, or make any number of notes which would be helpful to a user (or group of users) in developing, maintaining or using a database. As the need for collaboration amongst individual users in developing, maintaining or using databases grows, the ability to share metadata is fast becoming an increasingly desirable database feature.

One problem with conventional database implementations is that access to metadata has typically been limited to select users with elevated database privileges, e.g., administrators. For example, SQL Server has a "Description" attribute which is not easy to find, e.g., requiring a high level of database development proficiency, and also requires elevated privileges to update. Therefore, non-administrative users may not be able to view, modify or create metadata.

Another problem with conventional database implementations is that users are generally limited to a set of pre-defined metadata types and lack the ability to specify their own types. SQL Server has built-in functions which allow creation of "extended properties," allowing high-level users to specify custom metadata types. However, as with the Description attribute, access is difficult and requires elevated privileges. In addition, the ability to custom-define metadata has not been widely implemented in other database programs, e.g., Oracle.

Based on the above, there is a need for techniques or products which are user-friendly and enable multiple users, who may have varying privilege levels and/or database proficiencies, to share access to predefined metadata. It is further desirable that the users be able to share access to custom-defined metadata.

BRIEF SUMMARY OF THE INVENTION

According to a first aspect of the present invention, there is provided a computer-based method for storing data, comprising: receiving a metadata parameter from a first user, the parameter being associated with a property in a database containing a plurality of data records; storing the parameter; and providing a second user with access to the stored parameter, the second user having an access level to the database which is different from that of the first user.

According to a second aspect of the present invention, there is provided a computer-readable medium having stored thereon a series of instructions executable by a processor for storing data, the instructions configured to cause the processor to perform the steps of: receiving a metadata parameter from a first user, the parameter being associated with a property in a database containing a plurality of data records; storing the parameter; and providing a second user with access to the stored parameter, the second user having an access level to the database which is different from that of the first user.

According to a third aspect of the present invention, there is provided a data repository for storing data, comprising a first database configured to: store a plurality of metadata including a metadata parameter received from a first user, wherein the parameter is associated with a property in a second database containing a plurality of data records; and provide a second user with access to the stored parameter, the second user having an access level to the second database which is different from that of the first user.

BRIEF DESCRIPTION OF SEVERAL VIEWS OF THE DRAWINGS

FIG. 4 shows an example of a software routine according to an example embodiment of the present invention.

FIG. 5 shows another example of a software routine according to an example embodiment of the present invention.

FIG. 12 shows another example of a user interface according to an example embodiment of the present invention.

FIG. 13 shows another example of a user interface according to an example embodiment of the present invention.

FIG. 15 shows another example of a user interface according to an example embodiment of the present invention.

FIG. 16 shows another example of a user interface according to an example embodiment of the present invention.

DETAILED DESCRIPTION OF THE INVENTION

The present invention relates to methods for storing data. Exemplary embodiments of the present invention will be described with reference to the storage of data in a computer database containing a plurality of data records. In particular, the computer database may be a SQL Server database. However, it will be appreciated that the present invention described below may be implemented with any type of database. In addition, although the exemplary embodiments will be described in the context of a collaborative database environment including a plurality of users, it will be understood that the teachings of the present invention may be equally applicable to a single-user environment.

Figure 1:
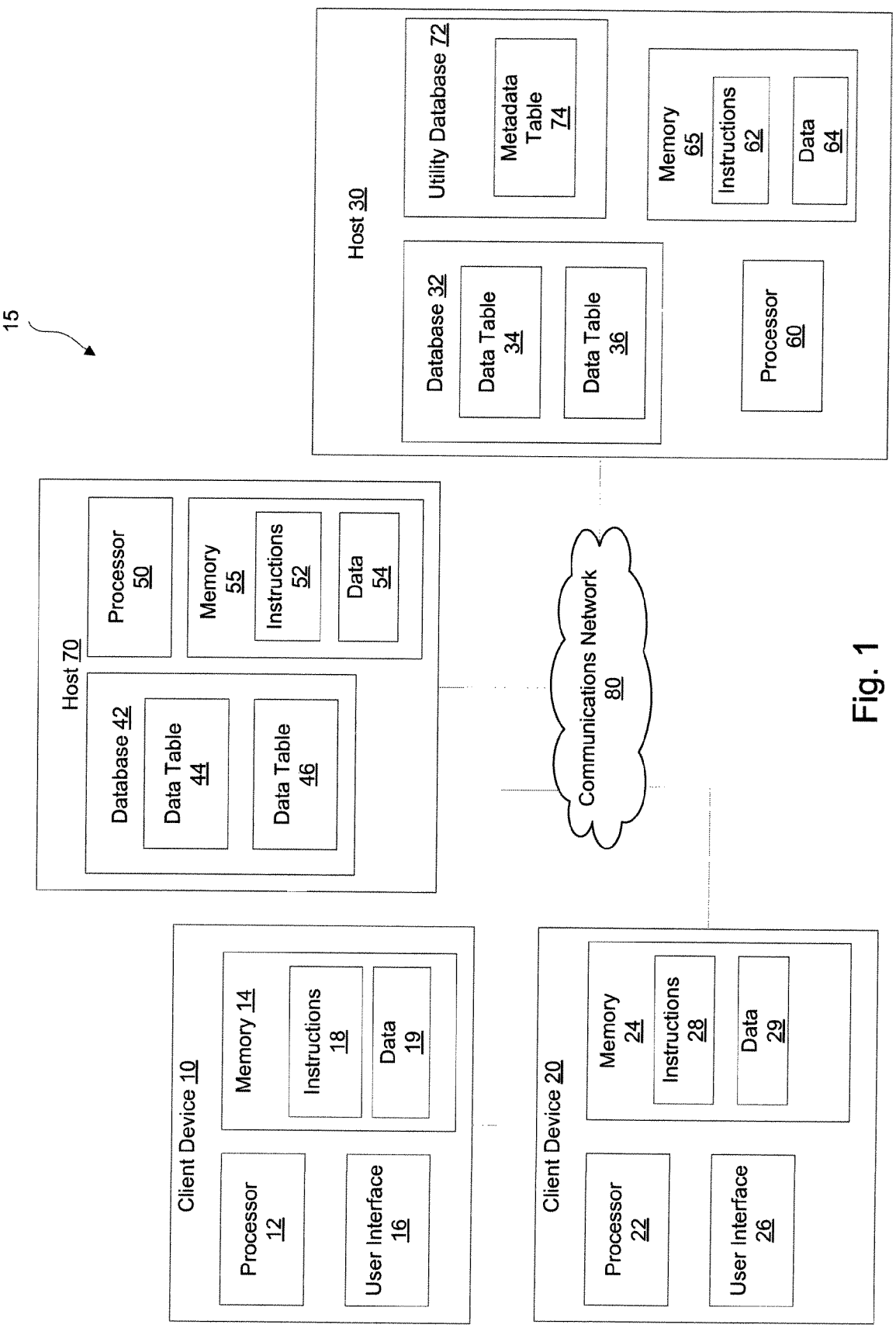
FIG. 1 shows an example of a system for storing data according to an example embodiment of the present invention.

FIG. 1 shows an example of a system 15 for storing data according to an example embodiment of the present invention. The system 15 may include a first host 30, a second host 70, one or more client devices 10 and 20, and a communications network 80 in communication with the client devices 10, 20 and the hosts 30, 70.

The communications network 80 may be any type of wired or wireless network including, for example, a virtual private network, a local area network, a wide area network, the Internet, etc. The communications network 80 may include any number of sub-networks and may be configured to allow data communication between various system components, e.g., between the client devices 10, 20 and the hosts 30, 70.

The hosts 30, 70 may be computing devices, e.g., servers, configured to provide access to databases stored therein. The host 30 may include a database 32 containing a plurality of data records in the form of one or more data tables 34 and 36. The host 30 may also include a utility database 72, a processor 60, and a memory 65.

The host 70 may include a database 42 containing a plurality of data records in the form of one or more data tables 44 and 46. The host 70 may also include a processor 50, and a memory 55.

The databases 32, 42 may be relational databases. In one embodiment, both databases 32, 42 may be implemented as SQL Server databases, although other database implementations may also be possible. In another embodiment, the databases 32, 42 may be of different types, e.g., one may be implemented as a SQL Server database and the other as an Oracle database.

The data tables 34, 36, 44 and 46 may include any type of data depending on the purpose and nature of the databases 32, 42. In many applications, one or several hosts may include any number of different databases, with data flowing from one database to another. For example, the database 32 may be a staging database serving as an intermediate destination for data and the database 42 may be a modeling database in which data simulations are carried out. The data contained in the databases 32, 42 may, in one embodiment, be derived from medical records associated with patients participating in a medical research project. Alternatively, data in other types of collaborative environments, e.g., a product development environment, may be stored. Although the data have been shown in the form of data tables, it will be appreciated that other data structures are also possible and may vary depending on a particular database implementation.

The processors 50, 60 may be microprocessors, application-specific integrated circuits, or any other electric circuit or combination of circuits configured to perform instructions.

The memories 55, 65 may each include instructions and data, e.g., instructions 52 and 62, and data 54 and 64, respectively. The instructions 52, 62 may be executed on a processor, e.g., the processors 50, 60, and may be configured to provide data server functionality when executed. For example, the instructions may be configured to service requests for data from the databases 32, 42, provide for cross-database communication, and perform database maintenance. The data 54, 64 may include temporary storage spaces, e.g., caches, program parameters and variables, operating system functions, and other data necessary for operating the databases 32, 42.

The utility database 72, which may be included in the host 30 and not the host 70, may include a metadata table 74 in which metadata describing actual data in the databases 32, 42 is stored. The utility database 72 may be implemented in any manner suitable for tracking database properties of the databases 32, 42, e.g., columns, tables, or the databases 32, 42 themselves. In one embodiment, the utility database 72 may be implemented using the same type of database as the databases 32, 42, e.g., as a SQL Server database. However, the utility database 72 need not be of the same type as either of the databases 32, 42. In an alternative embodiment, each host 30, 70 may include a utility database describing data contained in the host's own databases. In one embodiment, the metadata table 74 may include both predefined and custom metadata. In an alternative embodiment, the metadata table 74 may only include custom metadata while linking to, e.g., indexing, predefined metadata contained in the databases 32, 42.

The client device 10 may be a general purpose computing device operated by a first user, e.g., a personal computer or a laptop, including a processor 12, a memory 14 containing instructions 18 and data 19, and a user interface 16. The instructions 18 may be configured to cause the processor 12 to perform database requests such as retrieving or modifying data in the databases 32, 42. The instructions 18 may also be configured to cause the processor 12 to access the metadata table 74. As will be described in further detail below, access may involve reading and writing (e.g., creating, modifying, or deleting) metadata in addition to defining custom metadata types.

The client device 20 may be a general purpose computing device operated by a second user, e.g., a personal computer or a laptop, including a processor 22, a memory 24 containing instructions 28 and data 29, and a user interface 26. The instructions 28 may be configured to cause the processor 22 to perform database requests such as retrieving or modifying data in the databases 32, 42. The instructions 28 may also be configured to cause the processor 22 to access the metadata table 74, e.g., reading and writing metadata in addition to defining custom metadata types.

Figure 2:
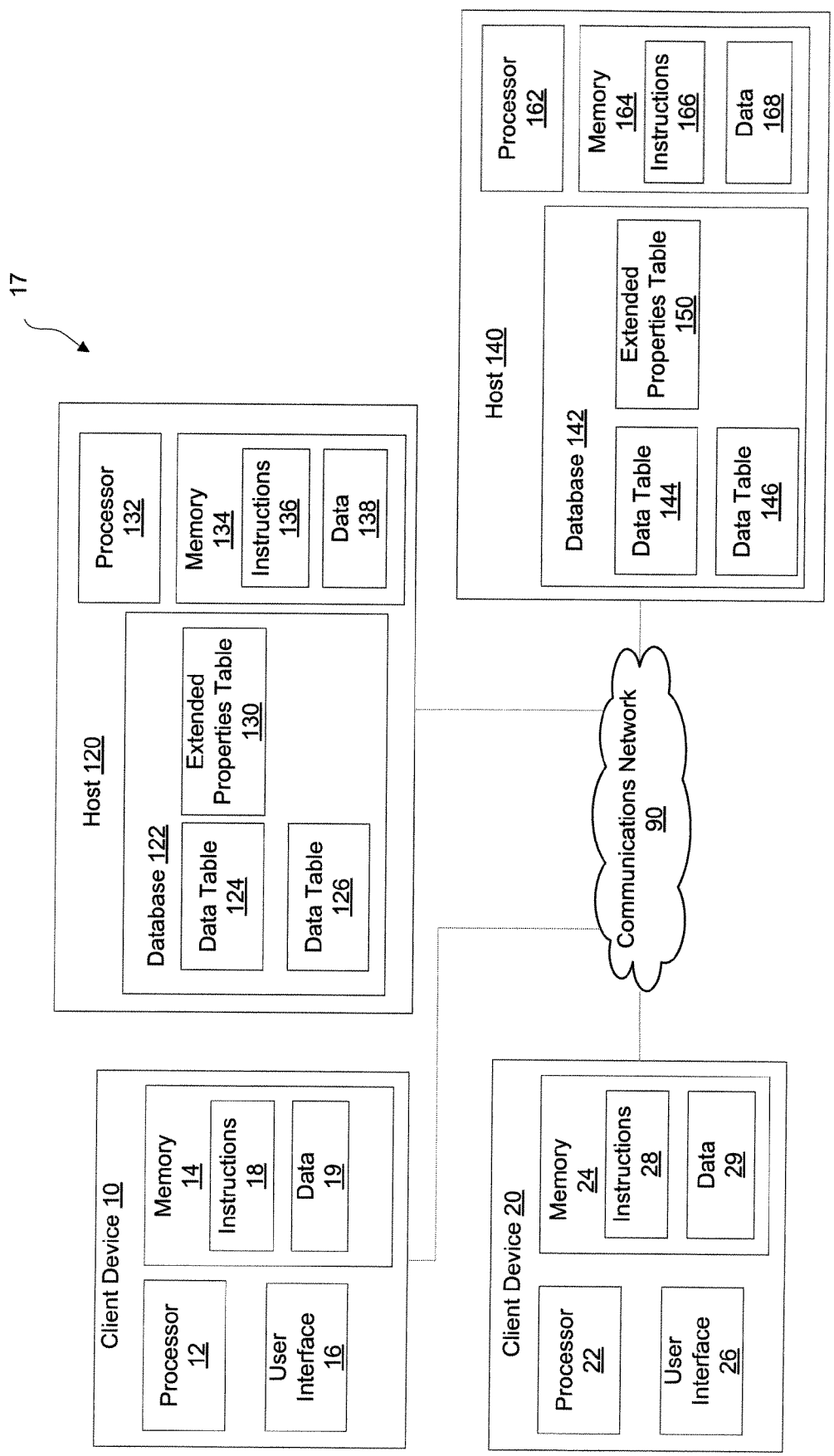
FIG. 2 shows another example of a system for storing data according to an example embodiment of the present invention.

FIG. 2 shows an example of a system 17 for storing data according to an example embodiment of the present invention. The system 17 may include the client devices 10, 20 as discussed above. The system 17 may also include a first host 120, a second host 140, and a communications network 90 in communication with the client devices 10, 20 and the hosts 120, 140.

The communications network 90 may be any type of wired or wireless network including, for example, a virtual private network, a local area network, a wide area network, the Internet, etc. The communications network 90 may include any number of sub-networks and may be configured to allow data communication between various system components, e.g., between the client devices 10, 20 and the hosts 120, 140.

The hosts 120, 140 may be computing devices, e.g., servers, configured to provide access to databases stored therein. The host 120 may include a database 122 containing a plurality of data records in the form of one or more data tables 124 and 126, and an extended properties table 130. The host 120 may also include a processor 132, and a memory 134.

The host 140 may include a database 142 containing a plurality of data records in the form of one or more data tables 144 and 146. The host 140 may also include a processor 162, a memory 164, and an extended properties table 150.

The databases 122, 142 may be relational databases. In one embodiment, both databases 122, 142 may be implemented as SQL Server databases, although other database implementations may also be possible. In another embodiment, the databases 122, 142 may be of different types, e.g., one may be implemented as a SQL Server database and the other as an Oracle database.

The data tables 124, 126, 144 and 146 may include any type of data depending on the purpose and nature of the databases 122, 142. In many applications, one or several hosts may include any number of different databases, with data flowing from one database to another. For example, the database 122 may be a staging database serving as an intermediate destination for data and the database 142 may be a modeling database in which data simulations are carried out. The data contained in the databases 122, 142 may, in one embodiment, be derived from medical records associated with patients participating in a medical research project. Alternatively, data in other types of collaborative environments, e.g., a product development environment, may be stored. Although the data have been shown in the form of data tables, it will be appreciated that other data structures are also possible and may vary depending on a particular database implementation.

The extended properties tables 130, 150 may include metadata respectively describing actual data in the databases 122, 142. As shown in FIG. 2, the extended properties tables 130, 150 may be stored in the databases 122, 142 separately from the data tables 124, 126, 144 and 146. However, the location of the extended properties tables 130, 150 may vary depending on a particular database implementation. It will be understood that in order to store the extended properties tables 130, 150, the database implementation may be required to support custom-defined metadata. Support may already have been provided by the database implementation, e.g., SQL Server. However, when the database implementation does not support custom-defined metadata, alternative modes of accessing database data may be utilized to create the extended properties tables 130, 150. The alternative modes may, for example, rely on pre-existing database routines for adding database entries. The fact that the data being added is metadata rather than actual data may, however, remain hidden from the database itself. In one embodiment, the extended properties tables 130, 150 may include both predefined and custom metadata. In an alternative embodiment, the extended properties tables 130, 150 may only include custom metadata while linking to, e.g., indexing, predefined metadata respectively contained in the databases 122, 142.

The processors 132, 162 may be microprocessors, application-specific integrated circuits, or any other electric circuit or combination of circuits configured to perform instructions.

The memories 134, 164 may each include instructions and data, e.g., instructions 136 and 166, and data 138 and 168, respectively. The instructions 136, 166 may be executed on a processor, e.g., the processors 132, 162, and may be configured to provide data server functionality when executed. For example, the instructions may be configured to service requests for data from the databases 122, 142, provide for cross-database communication, and perform database maintenance. The data 138, 168 may include temporary storage spaces, e.g., caches, program parameters and variables, operating system functions, and other data necessary for operating the databases 122, 142.

The client devices 10, 20 may be configured, e.g., via the instructions 18, 28, to access the databases 122, 142. Access may involve retrieving or modifying data in the databases 122, 142. Access may also involve reading and writing metadata in addition to defining custom metadata types, all of which may be performed using the extended properties tables 130, 150.

Exemplary embodiments of methods for storing data will now be described. The exemplary methods may be implemented on any of the systems previously described, e.g., the systems 15 and 17, but may also be successfully implemented in other systems according to the present invention. The exemplary methods may be implemented in any combination of hardware and/or software, and may be utilized alone or in conjunction with each other.

Figure 3:
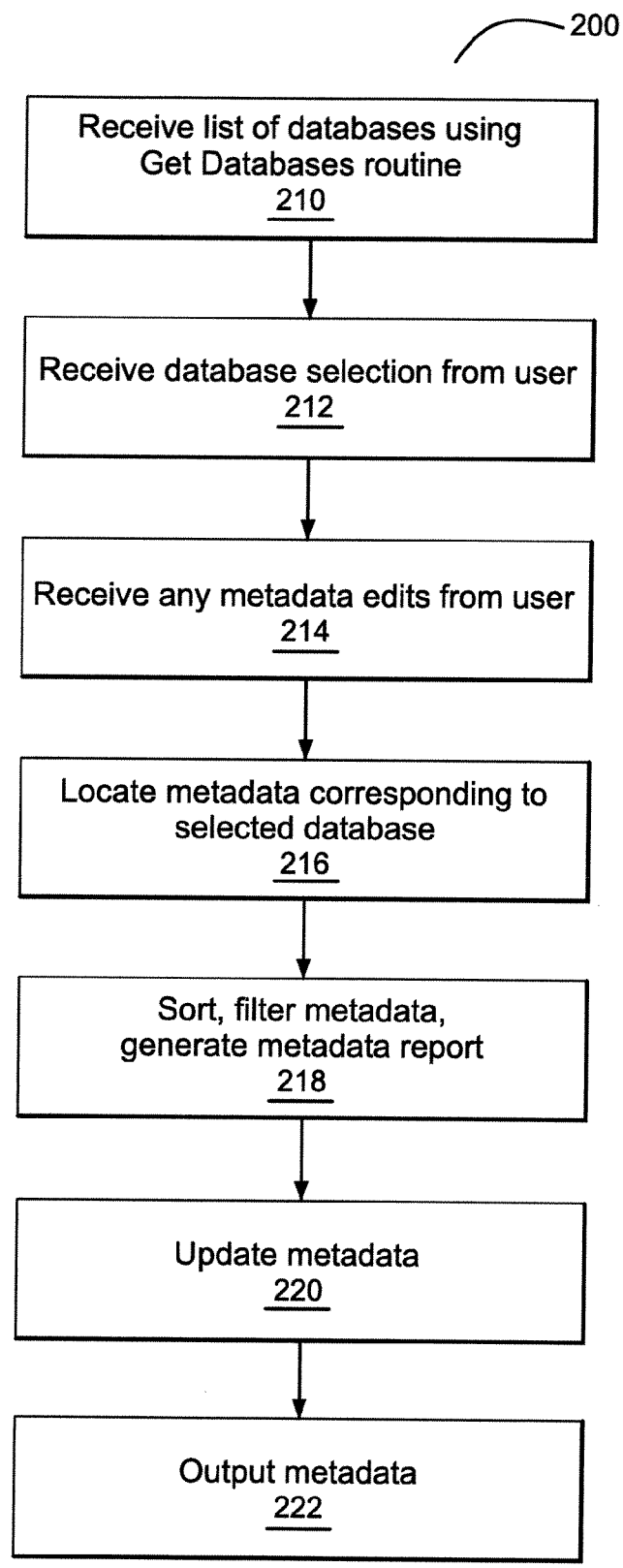
FIG. 3 shows an example of a method for storing data according to an example embodiment of the present invention.

FIG. 3 shows an example of a method 200 for storing data according to an example embodiment of the present invention. The method 200 may be implemented at a host, e.g., as instructions stored on a computer-readable medium such as any of the memories 55, 65, 134 and 164, and may be used to provide access to metadata contained in a metadata storage arrangement, e.g., the metadata table 74 or the extended properties tables 130, 150.

In 210, a list of databases may be received using a "GetDatabases" routine. FIG. 4 shows an example of a software routine 230 which may function as the GetDatabases routine. The databases need not reside on the same host. For example, the database list may include all databases stored in any host. Alternatively, the database list may only include a list of all databases stored at a particular host.

As shown, the software routine 230 may be configured to select all existing databases. FIG. 5 shows an example of an alternative software routine 232 which may function as the GetDatabases routine. The software routine 232 may be configured to filter out particular databases. As shown, the filtering may be performed by listing the names of file folders, e.g., "master", "tempdb", "model", etc., which should be ignored. The output of the GetDatabases function may be a list of the selected databases, sorted, e.g., alphabetically by database name.

In 212, a database selection may be received from a user, e.g., the user of the client device 10. The database selection may indicate a database for which the user wishes to view, modify, or delete metadata.

In 214, the host receives any metadata edits specified by the user. Metadata edits may involve creation of new metadata or modification of existing metadata, e.g., changing or deleting an existing metadata entry. Optionally, the user may choose not to perform any editing.

In 216, metadata corresponding to the selected database may be located. The metadata may be retrieved from the metadata storage arrangement, e.g., by referencing the selected database. Metadata may also be retrieved from the selected database itself, depending on whether or not the metadata entries are stored exclusively in the metadata storage arrangement. For example, as discussed above, in some embodiments predefined metadata entries (e.g., column data types, primary keys and foreign keys) may be stored in the database itself while a utility database is used to store custom metadata entries.

In 218, the metadata may be sorted and filtered. The user may specify metadata for reading or writing according to a hierarchical structure, e.g., by first selecting the database, then selecting tables within the database and columns within the selected tables, as will be explained in further detail below. The metadata may be filtered to remove non-specified metadata and sorted, e.g., according to database order. In addition, a metadata report may be generated which includes the specified metadata and which may reflect any edits received in 212.

In 220, the metadata may be updated by modifying the metadata to reflect any edits that were received.

In 222, the metadata may be output by displaying the contents of the metadata report, e.g., on a computer display at the client device 10.

Figure 6:
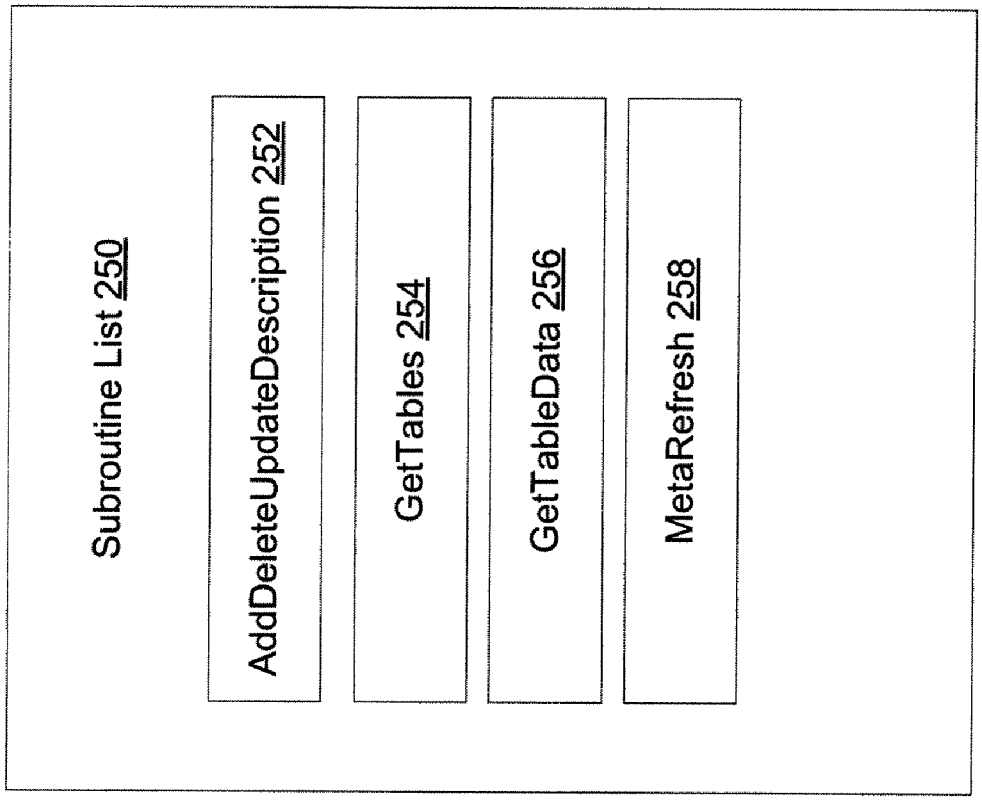
FIG. 6 shows an example of a subroutine list according to an example embodiment of the present invention.

FIG. 6 shows an example of a subroutine list 250 according to an example embodiment of the present invention. The subroutine list 250 may include an "AddDeleteUpdateDescription" subroutine 252, a "GetTables" subroutine 254, a "GetTableData" subroutine 256, and a "MetaRefresh" subroutine 258. Each of the subroutines will be described in further detail below.

Figure 7:
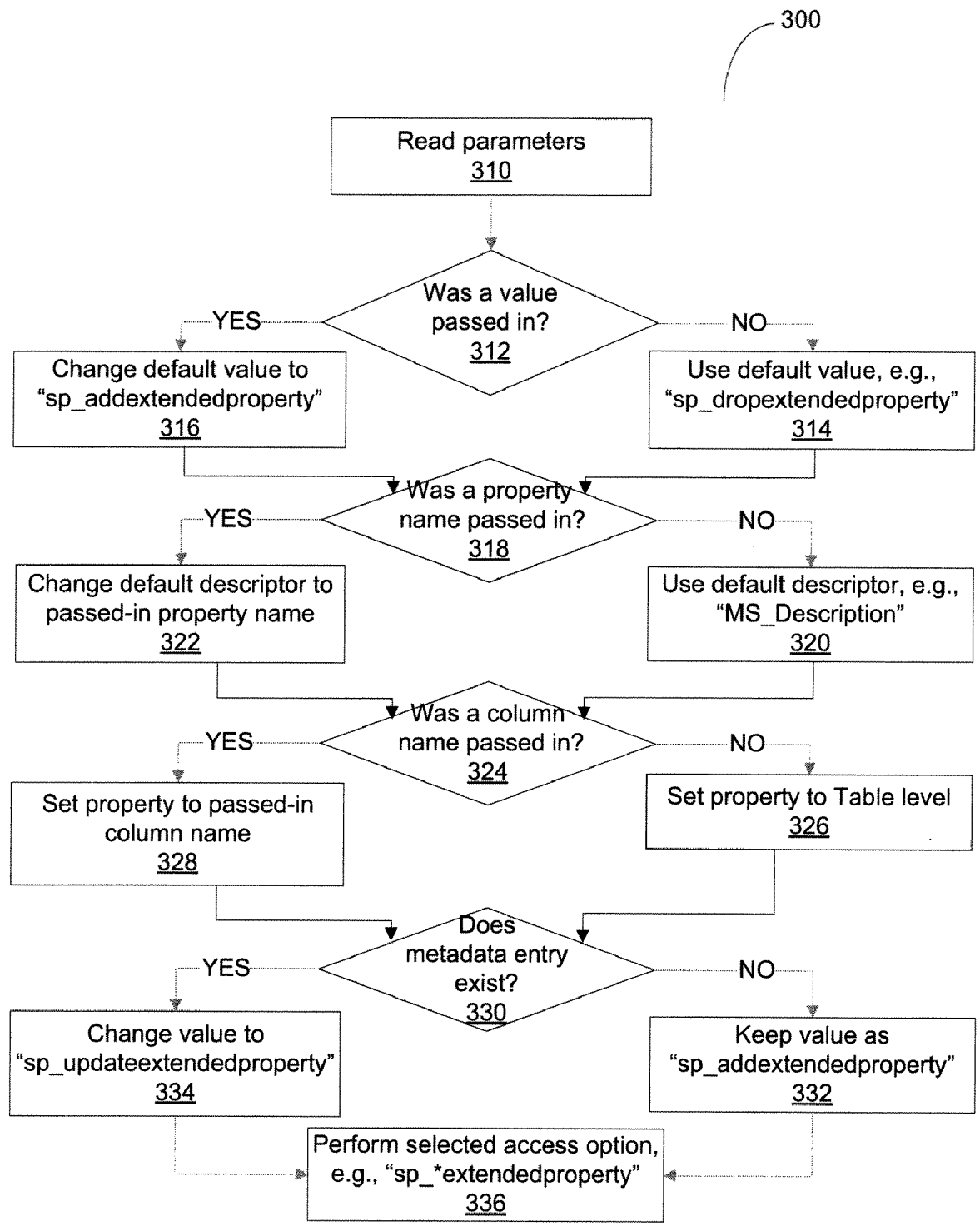
FIG. 7 shows an example of a subroutine according to an example embodiment of the present invention.

FIG. 7 shows an example of a method 300 for storing data according to an example embodiment of the present invention. The method 300 may be implemented at a host, e.g., as instructions stored on a computer-readable medium such as any of the memories 55, 65, 134 and 164, and may be used to implement the AddDeleteUpdateDescription subroutine 252 by performing one of any number of options for accessing a custom-defined metadata entry, including adding, deleting (dropping), and modifying (updating).

In 310, metadata parameters specified by the user may be read, e.g., at the host. In one embodiment, the metadata parameters may be provided in a function call to a software routine configured to perform the method 300. The metadata parameters may specify a database and a desired access option, along with any values needed to perform the desired option.

In 312, a determination may be performed whether a value was passed in with the metadata parameters. The value may indicate which option the user desires. If a value was not passed in, then the method 300 proceeds to 314, where a default value "sp_dropextendedproperty" may be used to indicate that the selected function is a deletion function.

If a value was passed in, then the method 300 proceeds to 316, where the default value may be changed to "sp_addextendedproperty" to indicate that the selected function is an adding function.

In 318, a determination may be performed whether a property name was passed in. The property name may indicate a name or identifier of a metadata entry to which the selected function will be applied. For example, the metadata entry may be associated with an entire database, a table or a column.

If a property name was not passed in, the method 300 proceeds to 320, where a default descriptor such as "MS_Description" may be used as the property name.

If a property name was passed in, the method 300 proceeds to 322, where the default descriptor may be changed to the passed-in property name.

In 324, a determination may be performed, based on the property name, whether a column name was passed in. If present, the column name may indicate the name of a corresponding metadata entry.

If a column name was not passed in, the method 300 proceeds to 326, where the property may be set to the table level in order to indicate that the metadata entry corresponds to a selected table in the database.

If a column name was passed in, the method 300 proceeds to 328, where the property may be set to the passed-in column name to indicate that the metadata entry corresponds to a selected column within a table in the database.

In 330, a determination may be performed whether the metadata entry indicated by the previous determinations in 318 and 324 exists.

If the metadata entry does not exist, then in 332, the value may remain as "sp_addextendedproperty" to indicate that a new metadata entry is being created.

If the metadata entry exists, then in 334, the value may be changed to "sp_updateextendedproperty" to indicate that an existing metadata entry is being updated.

In 336, the selected access option may be performed according to the specified value, e.g., by calling the SQL Server functions, "sp_addextendedproperty", "sp_dropextendedproperty" or "sp_updateextendedproperty" if the metadata entries are to be stored using an extended properties table. Alternative functions may be provided for performing the selected access option on metadata entries stored using a separate utility database, e.g., the utility database 72.

Depending on how the metadata storage arrangement is implemented, e.g., whether the metadata storage arrangement utilizes a utility database or SQL Server extended properties, the result of executing the selected access option may vary. In particular, it should be noted that when the sp_dropextendedproperty function is called, the metadata entry being dropped is deleted and removed from the database. It may be desirable, however, to retain the metadata entry. For example, in one embodiment, metadata entries stored in a utility database and which are dropped may be flagged with a deleted status identifier without actually deleting the metadata entries. In this manner, the metadata entries are preserved and another user may view (and possibly correct) any deletions made by the user. If a user wishes to recover a deleted entry, the status flag corresponding to the deleted entry may be reset, e.g., through a provided user interface, to indicate an active or non-deleted status. Deletion of predefined metadata entries may also be prevented by flagging in the manner described above. The status flags may be stored in the utility database 72 or any other convenient location, e.g., in a separate data table of each database.

It should also be noted that while the utility database 72 may easily be configured to prevent actual deletion of the metadata entries (both custom and predefined), there is no direct way to accomplish the same using extended properties. Extended properties deletion may be prevented if user rights are temporarily changed, e.g., temporarily suspending write permission. However, the process of changing permissions can be difficult and may interfere with the user's ability to access other metadata. Permission changing may be performed by providing another subroutine or modifying the AddDeleteUpdateDescription subroutine 252 to automatically lower permission levels whenever the sp_dropextendedproperty function is called. Flagging of extended properties may be accomplished by modifying the metadata entries, e.g., by inserting a text string such as a prefix or suffix code indicating status. However, the extended properties are deleted along with the properties to which they refer. When a database is dropped, the extended properties and any status codes contained therein are lost. Based on the above, it can be seen that the utility database 72 provides a more flexible alternative to using extended properties.

Figure 8:
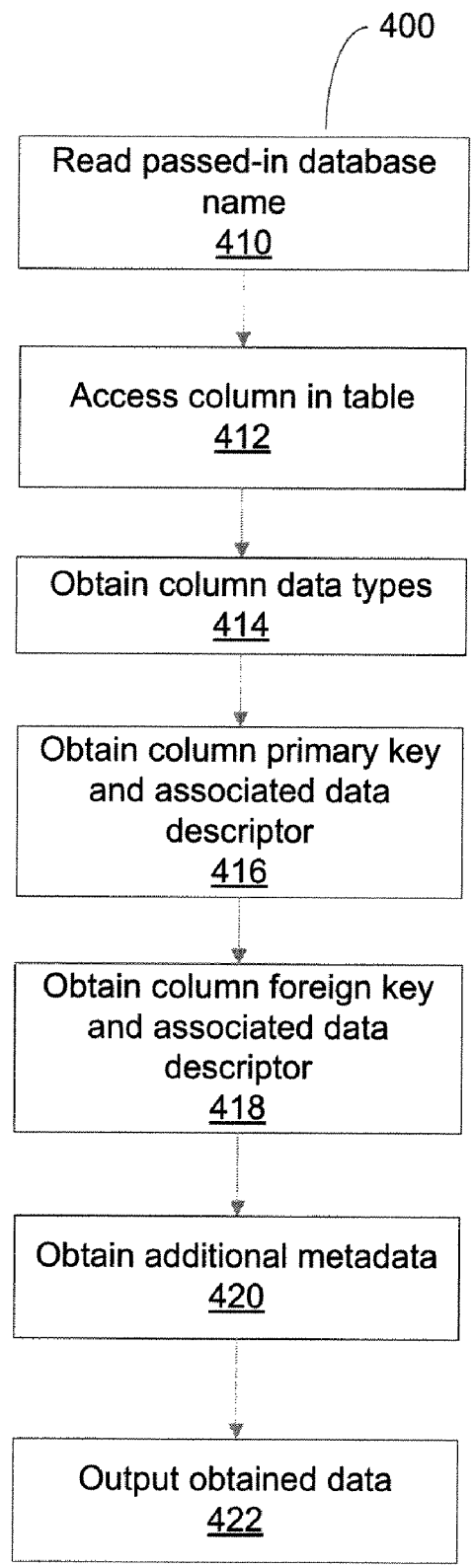
FIG. 8 shows another example of a subroutine according to an example embodiment of the present invention.

FIG. 8 shows an example of a method 400 according to an example embodiment of the present invention. The method 400 may be implemented at a host, e.g., as instructions stored on a computer-readable medium such as any of the memories 55, 65, 134 and 164, and may be used to implement the GetTables subroutine 254 by accessing a specified database and/or a metadata storage arrangement, e.g., the utility database 72 or the extended properties tables 130, 150, to obtain metadata entries associated with tables and columns of the specified database.

In 410, a passed-in database name may be read. The database name may specify the name of the database for which metadata entries should be obtained.

In 412, a column within a table of the specified database may be accessed by retrieving the table in which the column resides.

In 414, column data types may be obtained which comprise one or more predefined metadata entries indicating the type of data stored in the column, e.g., integer, character, date, time, etc.

In 416, a column primary key and a data descriptor (a predefined metadata entry) associated therewith may be obtained.

In 418, a column foreign key and a data descriptor associated therewith may be obtained. As understood in the art, the primary key and the foreign key may be used to identify the column within a table.

In 420, additional metadata may be obtained. The additional metadata may, for example, include custom metadata corresponding to the column or the table. The additional metadata may be obtained from the utility database 72 or the extended properties tables 130, 150. The additional metadata may also include any other metadata entries associated with the specified database.

In 422, the obtained data may be output, e.g., displayed to the user or passed to another subroutine. As seen from the previous steps, the obtained data may include the data types of the column, the primary and foreign keys, any data descriptors associated with the keys, and custom metadata corresponding to the column, the table in which the column is contained, or the specified database.

The method 400 may be repeated for each column and each table so that the output may include a list of all tables within the database, all columns within the tables, the column data types, primary/foreign keys and any data descriptors associated with the keys, along with custom metadata for all database properties within the specified database, including the specified database itself.

Figure 9:
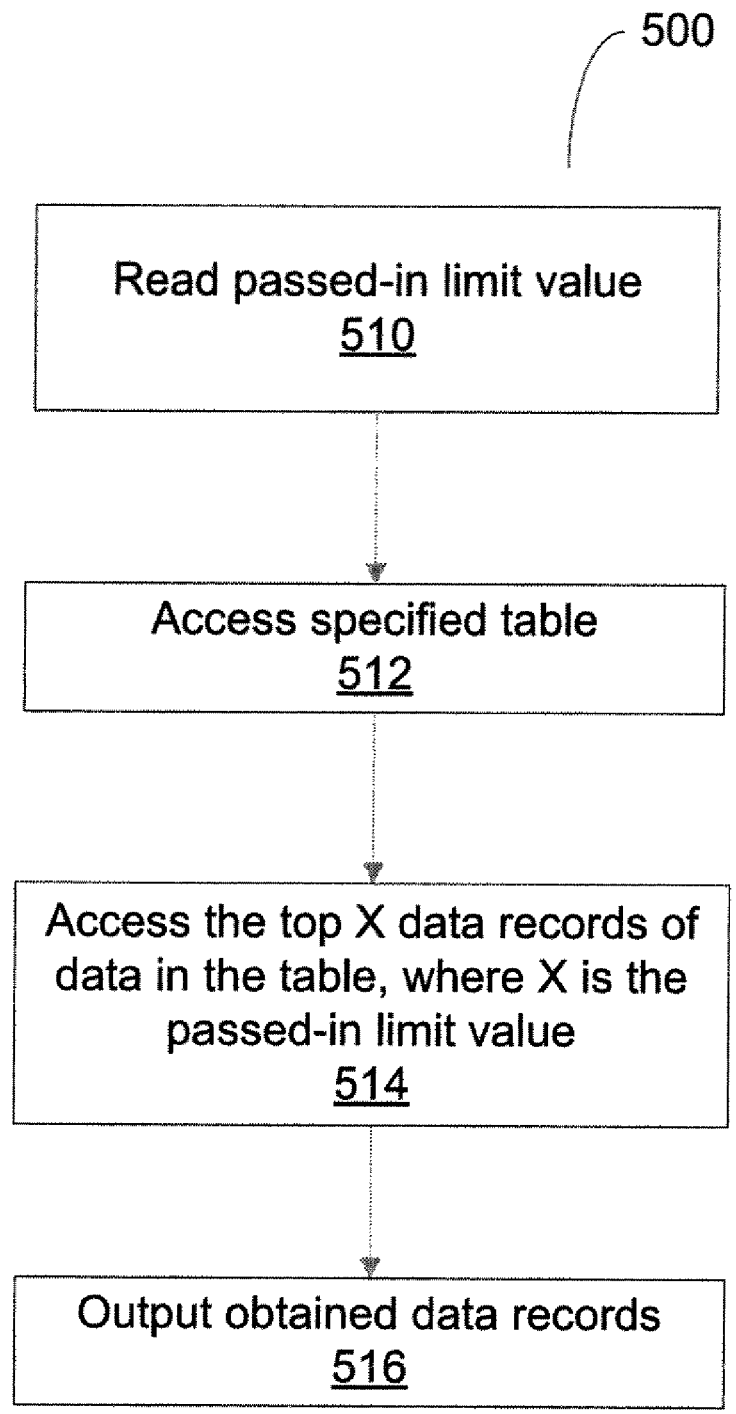
FIG. 9 shows another example of a subroutine according to an example embodiment of the present invention.

FIG. 9 shows an example of a method 500 according to an example embodiment of the present invention. The method 500 may be implemented at a host, e.g., as instructions stored on a computer-readable medium such as any of the memories 55, 65, 134 and 164, and may be used to implement the GetTableData subroutine 256 by accessing a specified table to obtain a specified number of data records contained therein.

In 510, a passed-in limit value may be read. The limit value may be user-specified and indicates the number of data records of actual data that the user desires to retrieve.

In 512, a specified table may be accessed.

In 514, the top X data records in the specified table may be obtained, where X is the limit value.

In 516, the obtained data records may be output. In this manner, the number of data records obtained from the table may be limited. This may be beneficial where, for example, a large number of data records are present and viewing the data records in their entirety would be impractical.

Figure 10:
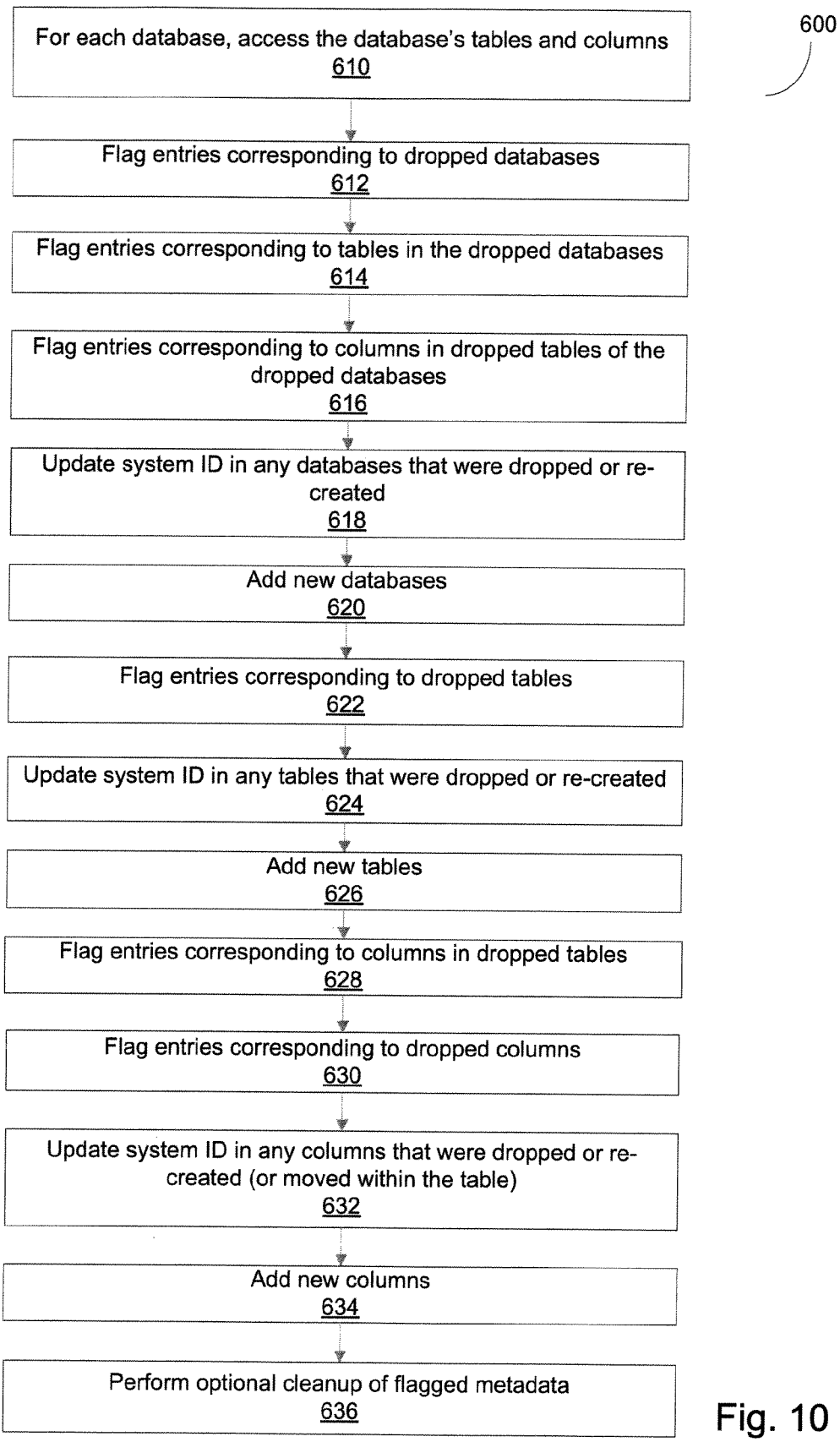
FIG. 10 shows another example of a subroutine according to an example embodiment of the present invention.

FIG. 10 shows an example of a method 600 according to an example embodiment of the present invention. The method 600 may be implemented at a host, e.g., as instructions stored on a computer-readable medium such as any of the memories 55, 65, 134 and 164, and may be used to implement the MetaRefresh subroutine 258 by accessing each database in the host and updating a status flag of each metadata entry associated with the data records in the database(s). The MetaRefresh subroutine 258 may be used to flag metadata entries corresponding to database properties which have been deleted (dropped) as an indication that the corresponding metadata entries are no longer valid. The method 600 may flag metadata entries which have been dropped directly in addition to flagging metadata entries which have been indirectly dropped as a result of dropping a parent database property. As discussed above, the status flags may be stored in the utility database 72 or in any other convenient location.

In 610, the method 600 may begin by accessing each database's tables and columns.

In 612, metadata entries corresponding to databases which were dropped may be flagged with a missing status identifier.

In 614, metadata entries corresponding to any tables located within the dropped databases may also be flagged to indicate a missing status identifier.

In 616, metadata entries corresponding to any columns located within the dropped tables may also be flagged to indicate a missing status identifier.

In 618, a system ID of any databases that were dropped or re-created (e.g., by resetting the status flag) may be updated, e.g., by setting the system ID to Null, setting the system ID to a new value, or setting the system ID to a previous value if the previous value has not been re-assigned to another database.

In 620, newly added databases may be added to the metadata storage arrangement. For example, pre-defined metadata associated with a recently added database may be added to or indexed by the metadata storage arrangement.

In 622, metadata entries corresponding to any tables that were dropped, e.g., tables that were previously individually selected for deletion, may be flagged with a missing status identifier.

In 624, a system ID of any tables that were dropped or re-created may be updated, e.g., by setting the system ID to Null, setting the system ID to a new value, or setting the system ID to a previous value.

In 626, newly added tables may be added to the metadata storage arrangement, e.g., by indexing the metadata contained in the new tables.

In 628, metadata entries corresponding to any columns within the dropped tables may be flagged with a missing status identifier.

In 630, metadata entries corresponding to any columns that were dropped may be flagged with a missing status identifier.

In 632, a system ID of any columns that were dropped or re-created (or moved within a table) may be updated, e.g., by setting the system ID to Null, setting the system ID to a new value, or setting the system ID to a previous value.

In 634, newly added columns may be added to the metadata storage arrangement, e.g., by indexing the metadata contained in the new columns.

In 636, an optional cleanup may be performed by searching the metadata storage arrangement for and removing obsolete metadata in the flagged metadata entries.

Exemplary embodiments of user interfaces for storing data according to the present invention will now be described. The exemplary user interfaces may be implemented as software programs at the client devices 10, 20. For example, the user interfaces may be included in a front end of a software program residing on the client devices 10, 20 while a back end of the software program may reside at a host to perform any of the methods previously discussed. In this manner, the front and back ends may work in conjunction to provide the user with the ability to view, or write, e.g., create, modify or delete, metadata entries.

As discussed above, databases may be implemented using SQL Server. Accordingly, one embodiment of the present invention may utilize SQL Server catalog views, which provide an interface to the metadata entries contained in a SQL Server database. However, the exemplary user interfaces may be realized using other techniques depending on the database implementation selected.

It will be appreciated that the exemplary user interfaces may be configured such that a user's ability to view, modify, or delete metadata entries mirrors the user's database privileges, e.g., read, write and execute privileges. For instance, a user may only view metadata entries corresponding to database properties to which the user has read privileges. In this manner, users of varying privilege levels may access metadata entries using the same user interface.

Figure 11:
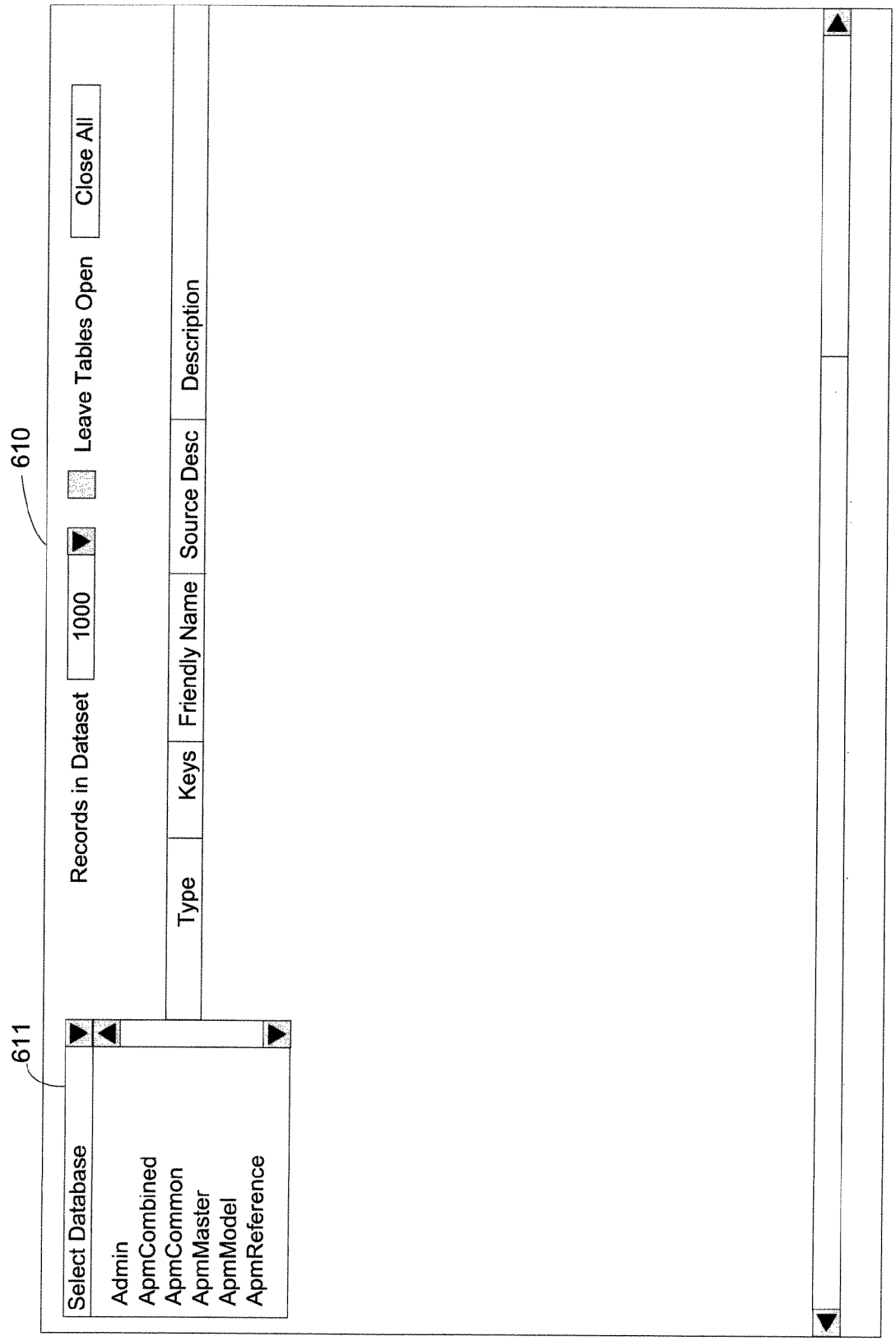
FIG. 11 shows an example of a user interface according to an example embodiment of the present invention.

FIG. 11 shows an example of a user interface 610 according to an example embodiment of the present invention. The user interface 610 may include a menu, e.g., a drop-down menu 611 configured to allow the user to select from a list of databases, such as the database list output by the GetDatabases routine.

FIG. 12 shows an example of a user interface 612 according to an example embodiment of the present invention. The user interface 612 may include a first column 614 of metadata entries associated with databases, e.g., metadata describing the type or purpose of each database. A second column 616 may include the names of each table in the databases of the column 614.

FIG. 13 shows an example of a user interface 618 according to an example embodiment of the present invention. The user interface 618 may include the columns 614 and 616 in addition to columns 620, 622, 624, 625, 626 and 628. The column 620 may be configured to display a list of columns contained within a table when the column entry corresponding to that table in the column 616 is selected, e.g., clicked.

Selecting the table's column entry may trigger the display of the table's actual data contents, which may be displayed in another window or on a separate menu tab 617.

Selecting the table's column entry may also trigger the display of metadata entries associated with the table and/or the columns contained in the table. The metadata entries may be displayed in the columns 622, 624, 625, 626, and 628, which may respectively include data types, foreign and primary keys, friendly names, source descriptions, and data descriptions. Data types may include, for example, integers, arrays, characters, etc. Foreign and primary keys may, as previously discussed, be used to locate columns in a table. Friendly names may be any sequence of characters, e.g., a nickname or a mnemonic, created by a user as an alternative to remembering the full name of the database property associated therewith. Source descriptions may include an identifier of a user who viewed, created, modified, or deleted, a metadata entry. The identifier may be stored with the metadata entry when an indication of access is received. In one embodiment, the source descriptions may only include the identifier associated with the most recent accessing of the metadata entry. In another embodiment, the source descriptions may include a user history including identifiers of a plurality of users who viewed, created, modified, or deleted the metadata entry. Data descriptions may include short descriptions of the database property associated therewith. The data descriptions may describe the database property itself, e.g., describing what is contained in a column. Alternatively, the data descriptions may be used as a note-taking entry or for sharing comments with other users.

Figure 14:
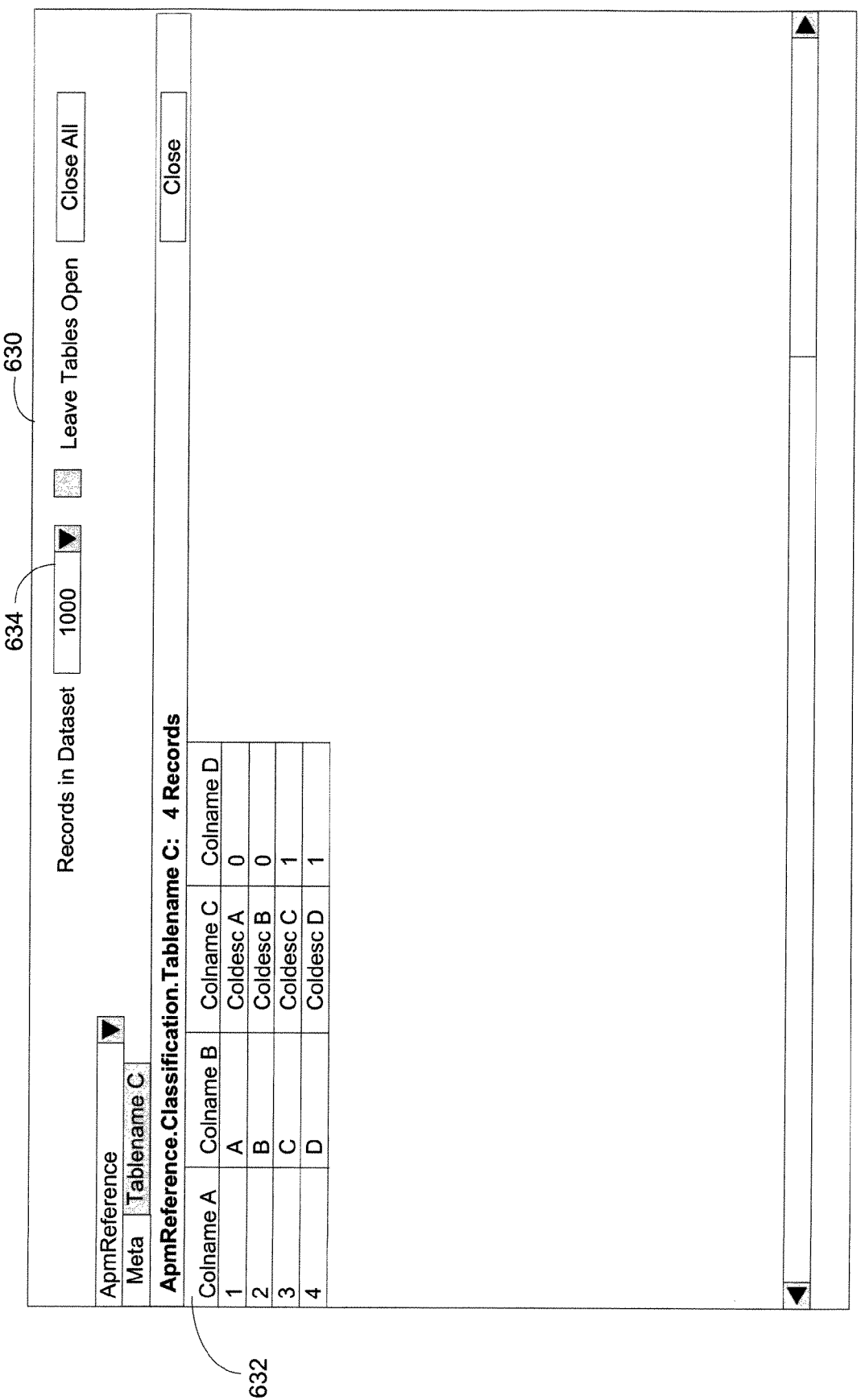
FIG. 14 shows another example of a user interface according to an example embodiment of the present invention.

FIG. 14 shows an example of a user interface 630 according to an example embodiment of the present invention. The user interface 630 may be triggered by selecting the tab 617 to display actual data contents 632 of a selected table, e.g., the actual data contained in each column of the selected table. The user interface 630 may include a record limiting field 634 in which a user may specify the maximum number of records to be displayed.

FIG. 15 shows an example of a user interface 636 according to an example embodiment of the present invention. The user interface 636 may be configured to display expanded views of multiple tables 615, 617 and 619 of the column 616. The expanded views may include displaying a list of columns contained within each table, as shown in the column 620. In this manner, the user may selectively enable the display of each table's column list.

FIG. 16 shows an example of a user interface 638 according to an example embodiment of the present invention. The user interface 638 may be configured to allow selective display of table column lists. As shown, display of the column lists of the tables 615 and 619 has been disabled while the column list of the table 617 remains displayed. A menu option 640 may be configured to allow the actual data contents of a table, which may be displayed in a separate window or tab, to remain displayed even after display of the table's column list has been disabled. A menu option 642 may be configured to disable the display of all table contents, e.g., closing all tabs that include actual data.

Based on the above descriptions of the exemplary user interfaces, it can be seen that the actual data content and the metadata entries associated therewith may be accessed in a hierarchical manner. In particular, users can navigate the user interface in a tree-like fashion, starting, e.g., by selecting a database and progressively narrowing selections until the desired data/metadata is displayed.

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A computer-based method for storing data, comprising:
receiving a metadata parameter from a first user, the parameter being associated with a property in a database containing a plurality of data records;
storing the parameter;
providing a second user with access to the stored parameter, the second user having an access level to the database which is different from that of the first user;
receiving, from one of the users, a request for deletion of the stored parameter, whereby the one of the users confirms an intent to delete the stored parameter; and
applying a flag to the stored parameter without deleting the stored parameter, the flag indicating a deleted status and visible to both users;
wherein the parameter defines a custom metadata type, a value of the parameter being created by the first user, and both users are members of a user group that has access to the stored parameter.

2. The method of claim 1, wherein access includes at least one of a read privilege, a write privilege and an execute privilege with respect to the stored parameter.

3. The method of claim 1, wherein the database property is one of the database itself, a table within the database and a column within the table.

4. The method of claim 1, further comprising:
associatively storing an identifier of the first user with the parameter when the parameter is received.

5. The method of claim 1, further comprising:
storing the parameter in a utility database separate from the database.

6. The method of claim 1, further comprising:
storing the parameter in the database.

7. The method of claim 1, further comprising:
providing a user interface configured to enable one of the users to reset the flag to indicate a non-deleted status.

8. The method of claim 1, wherein the parameter includes one of a nickname and a user-created description.

9. The method of claim 1, further comprising:
providing a user interface configured to selectively display, in a hierarchical manner, metadata including the stored parameter when a corresponding database property is selected by one of the users.

10. The method of claim 1, further comprising:
applying a flag to the stored parameter when the associated property is dropped from the database, the flag indicating a missing status and visible to both users.

11. A computer-readable medium having stored thereon a series of instructions executable by a processor for storing data, the instructions configured to cause the processor to perform the steps of:

receiving a metadata parameter from a first user, the parameter being associated with a property in a database containing a plurality of data records;

storing the parameter;

providing a second user with access to the stored parameter, the second user having an access level to the database which is different from that of the first user;

receiving, from one of the users, a request for deletion of the stored parameter, whereby the one of the users confirms an intent to delete the stored parameter; and applying a flag to the stored parameter without deleting the stored parameter, the flag indicating a deleted status and visible to both users;

wherein the parameter defines a custom metadata type, a value of the parameter being created by the first user, and both users are members of a user group that has access to the stored parameter.

12. The computer-readable medium of claim 11, wherein access includes at least one of a read privilege, a write privilege and an execute privilege with respect to the stored parameter.

13. The computer-readable medium of claim 11, wherein the database property is one of the database itself, a table within the database and a column within the table.

14. The computer-readable medium of claim 11, wherein the instructions are configured to cause the processor to associatively store an identifier of the first user with the parameter when the parameter is received.

15. The computer-readable medium of claim 11, wherein the instructions are configured to cause the processor to store the parameter in a utility database separate from the database.

16. The computer-readable medium of claim 11, wherein the instructions are configured to cause the processor to store the parameter in the database.

17. The computer-readable medium of claim 11, wherein the instructions are configured to cause the processor to provide a user interface configured to enable one of the users to reset the flag to indicate a non-deleted status.

18. The computer-readable medium of claim 11, wherein the parameter includes one of a nickname and a user-created description.

19. The computer-readable medium of claim 11, wherein the instructions are configured to cause the processor to provide a user interface configured to selectively display, in a hierarchical manner, metadata including the stored parameter when a corresponding database property is selected by a user.

20. The computer-readable medium of claim 11, wherein the instructions are configured to cause the processor to apply a flag to the stored parameter when the associated property is dropped from the database, the flag indicating a missing status and visible to both users.

21. A data repository for storing data, comprising:

a first database configured to:

store a plurality of metadata including a metadata parameter received from a first user, wherein the parameter is associated with a property in a second database containing a plurality of data records;

provide a second user with access to the stored parameter, the second user having an access level to the second database which is different from that of the first user;

receive, from one of the users, a request for deletion of the stored parameter, whereby the one of the users confirms an intent to delete the stored parameter; and apply a flag to the stored parameter without deleting the stored parameter, the flag indicating a deleted status and visible to both users;

wherein the parameter defines a custom metadata type, a value of the parameter being created by the first user, and both users are members of a user group that has access to the stored parameter.

* * * * *